United States Patent [19]

Jeal

[11] Patent Number: 4,589,155

[45] Date of Patent: May 20, 1986

[54] METHOD FOR MAKING A NUT FOR A BLIND FASTENER

[75] Inventor: Harvey P. Jeal, Stevenage, England

[73] Assignee: Avdel Limited, Hertfordshire, England

[21] Appl. No.: 442,504

[22] Filed: Nov. 17, 1982

[30] Foreign Application Priority Data

Nov. 18, 1981 [GB] United Kingdom ............ 8134740

[51] Int. Cl.$^4$ .................................. B21D 53/24
[52] U.S. Cl. ............................................ 10/86 A
[58] Field of Search ............ 10/10 R, 27 R, 76 R, 10/79, 85, 86 A; 411/276, 277, 281, 282, 283, 285, 287, 288

[56] References Cited

U.S. PATENT DOCUMENTS

| | | | |
|---|---|---|---|
| 332,540 | 12/1885 | Law ................................ | 10/86 A |
| 3,245,096 | 4/1966 | McKay et al. ................. | 10/10 R |
| 3,295,580 | 1/1967 | Waltermire ..................... | 10/27 R |
| 3,461,470 | 8/1969 | Cochrum ........................ | 10/10 R |
| 3,643,544 | 2/1972 | Massa ............................. | 411/43 |
| 4,352,219 | 10/1982 | McMurray et al. ........... | 10/86 A |

FOREIGN PATENT DOCUMENTS 222771  7/1959  Australia ............................ 411/283

*Primary Examiner*—E. Michael Combs
*Attorney, Agent, or Firm*—Oblon, Fisher, Spivak, McClelland & Maier

[57] ABSTRACT

A three piece blind fastener of the kind comprising a tubular nut having a head at one end and a tapered nose at the other end, an expansible sleeve, and a headed bolt threadedly engaged with the nut for forcing the sleeve on to the nose of the nut to form a blind head, has the thread of the nut provided with a locking zone in which the bore of the nut is constricted and, in cross sectional shape, a closed non-reentrant non-circular curve so that the nut resiliently interferes with the bolt.

A die, and a method of providing the nut with the locking zone by means of the die are disclosed. The die has a tapered aperture having a cross sectional shape corresponding to the desired shape of the locking zone, and the method involves forcing the tapered nose of the nut into the aperture so as to constrict the bore, in a zone spaced from its ends, to the desired extent and impose the non-circular cross sectional shape on the constricted zone.

2 Claims, 9 Drawing Figures

METHOD FOR MAKING A NUT FOR A BLIND FASTENER

This invention relates to a blind fastener, and particularly to a blind fastener comprising interengaging screw-threaded pieces in which the screw threads are able to lockingly interengage.

The invention more particularly relates to a self-locking blind fastener of the kind comprising three pieces, namely:- a screw-threaded headed bolt; a nut having a female screw thread for mating engagement with the thread of the bolt and having a shank and an enlarged head, the shank providing a nose which tapers towards the end remote from the head; and a sleeve which can be expanded to form a blind head by screwing the bolt through the nut so that the bolt head abuts the sleeve and forces it onto the tapered nose of the nut, and in which the stem of the bolt is provided with a breakneck at which the stem will break when subjected to a predetermined torque. The breakneck demarcates the bolt into a main part, which includes the bolt head and a threaded portion of the stem adjoining the head, and a break-off portion of the stem, remote from the bolt head, which is connected to the main part by the breakneck.

Prior to use, the pieces are assembled, the bolt being inserted through the sleeve and then screwed into the end of the nut remote from the nut head until the break-off portion projects from the head end of the nut. In use, the bolt head, sleeve and the shank of the nut are inserted through aligned holes in the workpiece members to be fastened together so that the head of the nut abuts one side of the workpiece and the tapered nose projects beyond the opposite side of the workpiece. The fastener is set by gripping the projecting break-off portion and rotating the bolt relative to the nut so that, by virtue of the threaded engagement between the nut and bolt, the head of the bolt is advanced towards the shank of the nut, forcing the sleeve over the tapered nose and thereby causing the sleeve to be expanded to form a blind head which is held in abutment with the said opposite side of the workpiece by the bolt head.

It will be appreciated that during setting of the fastener, the torque required to turn the bolt relative to the nut increases as the expansible sleeve is forced further onto the nose of the nut and as the members of the workpiece are forced together and compressed. Eventually, the required torque exceeds that sustainable by the breakneck so that the bolt breaks at the breakneck, leaving the main part of the bolt as an integral part of the set fastener, and the break-off portion is discarded. Thus, the breakneck enables the break-off portion of the bolt to be removed after it has served its purpose of facilitating rotation of the bolt, leaving the set fastener with a neat appearance.

The breakneck also serves a further important function in that it serves to limit the force which can be transmitted via the fastener to the workpiece. By carefully controlling the strength of the breakneck, it is possible to ensure that, on the one hand it is capable of transmitting sufficient torque to enable the members of a workpiece to be clamped together with satisfactory tightness before it breaks, and that on the other hand it will break before the fastener is overtightened, thereby avoiding the risk of damaging the workpiece or the fastener itself.

Blind fasteners of such a kind are made of high strength materials and sold under the Registered Trade Mark "JO-BOLT" for use in the aerospace industry for the assembly of parts of aircraft and space vehicles, and there is now a demand for such fasteners to be provided with self-locking threads in order to reduce the risk of the nut and bolt becoming unscrewed in service as can happen as a result of stress and vibration over prolonged periods of time.

Many kinds of self-locking thread arrangements have been proposed and used for nut and bolt type fasteners but few are suitable for blind fasteners of the kind referred to above.

The main reason for this is that, because of the need to limit the torque transmissable by the breakneck in order to avoid overtightening of the fastener, the total amount of torque required simultaneously to engage the lock, to form the blind head and to clamp the workpiece, must also be limited to a value below that at which the breakneck will break. It is generally found that the stronger the lock required, the greater will be the torque required to engaged the lock, but, since this will be an integral part of the total amount of torque which the breakneck will have to transmit, it will be appreciated that the torque required for the engagement of the lock cannot be permitted to be so great as to cause the total amount of torque required for engaging the lock, forming the blind head and clamping the workpiece to approach too closely to the maximum substainable by the breakneck.

Nevertheless, it is clearly desirable that the lock be as strong as possible consistent with the other factors involved. It is therefore important in manufacturing such fasteners that careful control be exterted in order to ensure minimum variation from the values which are determined to be suitable.

It is therefore also desirable that the design of the fastener and method of manufacture should lend themselves to easy control of the important values.

We have now devised a blind fastener of the kind referred to which effectively meets the current requirements of the market for self-locking capability and which can be manufactured to tolerances which are easily controlled so as to provide consistent performance as between one fastener and another.

According to one aspect of the invention, there is provided a three piece blind fastener comprising a screw threaded bolt, an expansible sleeve and a tubular nut having an internally screw threaded bore for receiving the bolt in threaded engagement therewith;

the bolt comprising a threaded stem having a break-off portion at one end connected to the rest of the stem by a breakneck, and a head at the other end of the stem;

the nut comprising a shank having an enlarged head at one end, and a nose which tapers away from the head at the other end of the shank;

the bolt being engaged in the bore of the nut so that the break-off portion projects from the head of the nut, and the sleeve being interposed on the stem of the bolt between the head of the bolt and the nose of the nut;

the nut having a locking zone wherein the internally threaded bore of the nut has a cross-sectional shape which is non-circular and non-reentrant, and such that the nut presents at least one arcuate zone circumferentially of the bolt in which the thread of the nut interferes resiliently with the thread of the bolt.

The locking zone may be spaced from the said other end of the shank.

At least part of the locking zone may be within the nose of the nut.

The locking zone may be entirely within the nose of the nut.

The shape of the bore in the locking zone may be such as to present three of said circumferentially arcuate zones.

The cross-sectional shape of the bore in the locking zone may be such that, at the effective diameter of the thread, the bore presents a curve of constant diametral chord length.

The bore of the nut may be a parallel bore save for having a constriction in the locking zone.

The length of the circumference of the bore at the effective diameter of the thread may be less in the locking zone of the nut than outside the locking zone of the nut.

According to another aspect of the invention there is provided a method of making a three piece blind fastener as aforesaid wherein a tapered end portion of a shank of a tubular nut having a threaded bore is forced into an opening of a die, which opening has a cross-sectional shape which is a closed, non-circular, non-reentrant curve, and a shape corresponding to that of the opening is thereby imposed on a zone of the bore so that the thread will resiliently interfere with a complementary bolt.

The method may include forcing the die to constrict the end portion of the shank so as to reduce the length of the circumference of the bore at the effective diameter of the nut thread, and thus to reduce the clearance between the threads of the nut and bolt.

According to a yet further aspect of the invention, there is provided a die for use in forming a blind fastener according to the invention, which die comprises a body of hard material having a tapering opening extending inwardly of the body, said opening having a cross-sectional shape which is a closed, non-circular, non-reentrant curve which lies between concentric major and minor circles and comprises at least one arc, the arc having ends tangential to and touching the major circle and being, intermediate between its ends, tangential to and touching the minor circle whereby, on forcing the tapered nose of a nut for a blind fastener into said opening, a zone of the bore in the nose of the nut is constrained to assume a shape corresponding to the cross-sectional shape of the die.

A preferred form of the invention will now be described with reference to the accompanying drawings in which:

FIG. 1 is a perspective view showing, in separated relation, the pieces of a three piece blind fastener according to the invention;

FIG. 2 is a sectional elevation showing a workpiece 68 comprising two sheets 70, 72 to be fastened together, and a fastener according to the invention disposed in registering apertures 74, 76 in the sheets and ready to be set to fasten the sheets together;

FIG. 6 is a fragmentary view in perspective, illustrating another embodiment;

Figure 1:
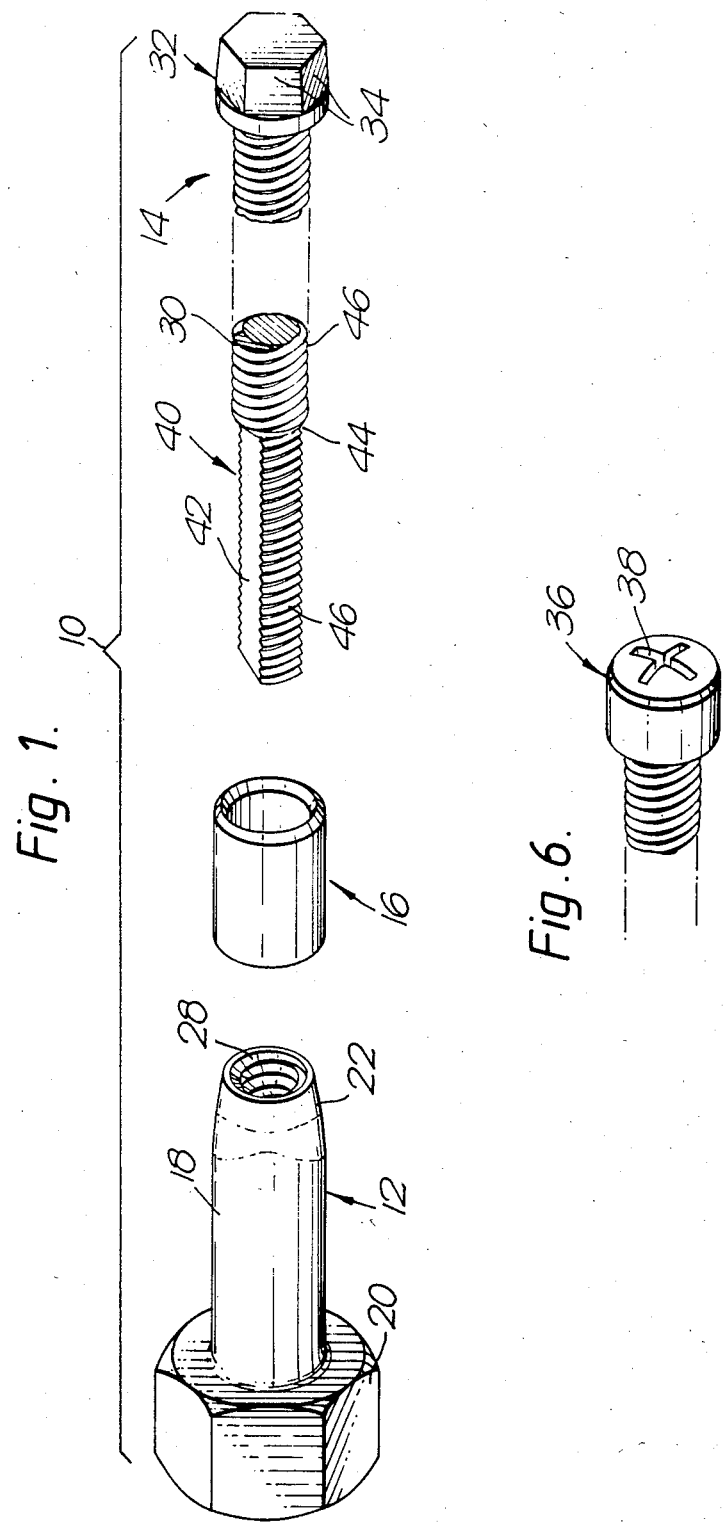

Referring first to FIG. 1 of the drawings, a blind fastener 10 comprises three pieces, namely a tubular nut 12, a bolt 14 threadedly engageable with the nut, and an expansible sleeve 16.

The nut 12 comprises an elongate shank 18 and an enlarged hexagonal head 20 at one end of the shank. A portion 22 of the shank adjoining the tail end of the shank (that is, the end remote from the head 20) is tapered away from the head and provides a nose of generally conical shape. The tubular nut is formed with an internal screw thread 24 which extends throughout the length of its bore, and has a locking zone 26 in which the thread 24 is adapted to lockingly engage a complementary thread.

The sleeve 16 is a tubular cylinder having an external diameter substantially equal to that of the shank of the nut and has a bore which is flared at both ends, the flared ends each reaching slightly greater internal diameter than the smallest external cross-section of the tapered nose 22 of the nut so that the nose 22 can easily enter either of the flared ends of the sleeve.

Figure 2:
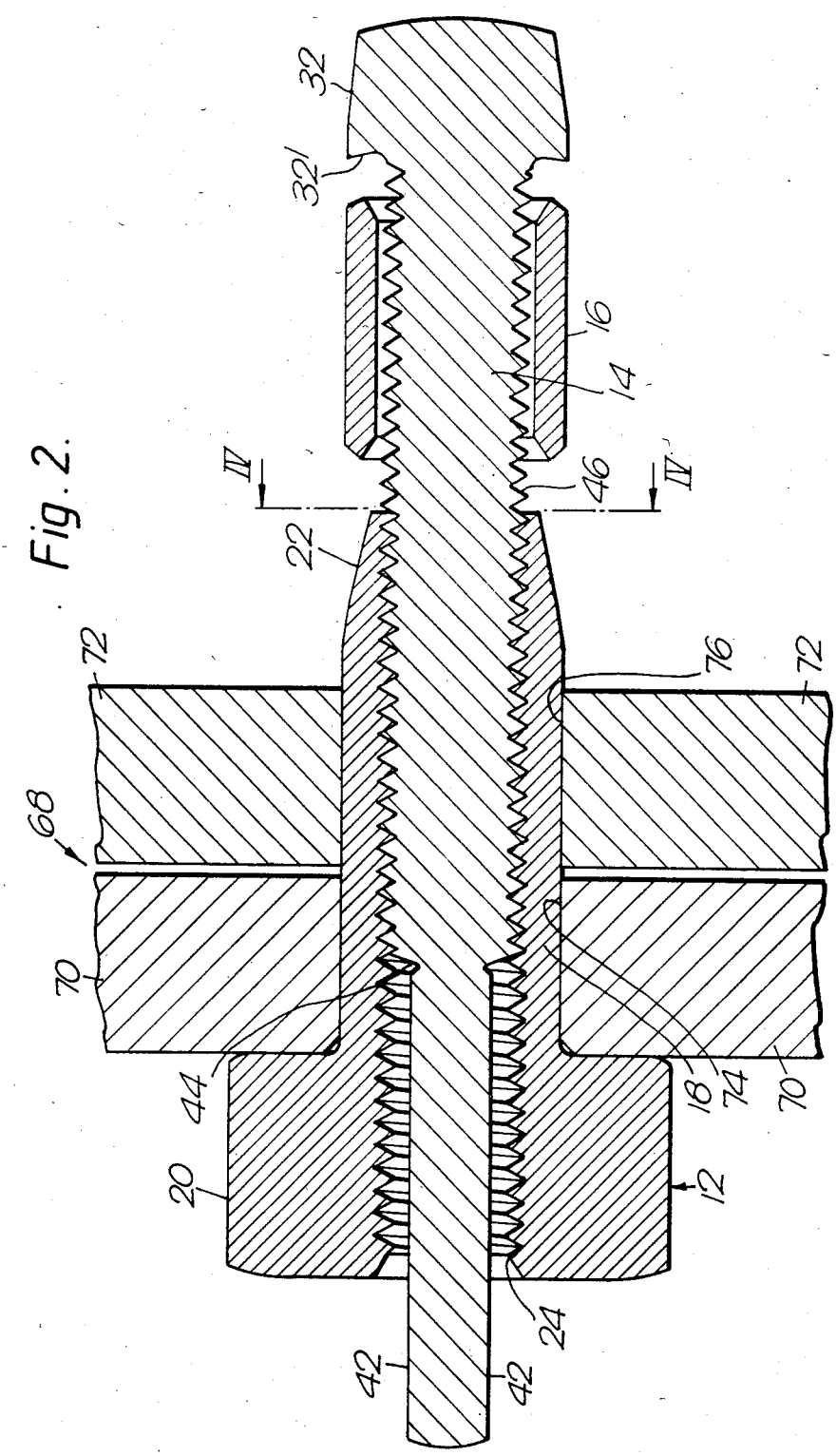
Figure 3:
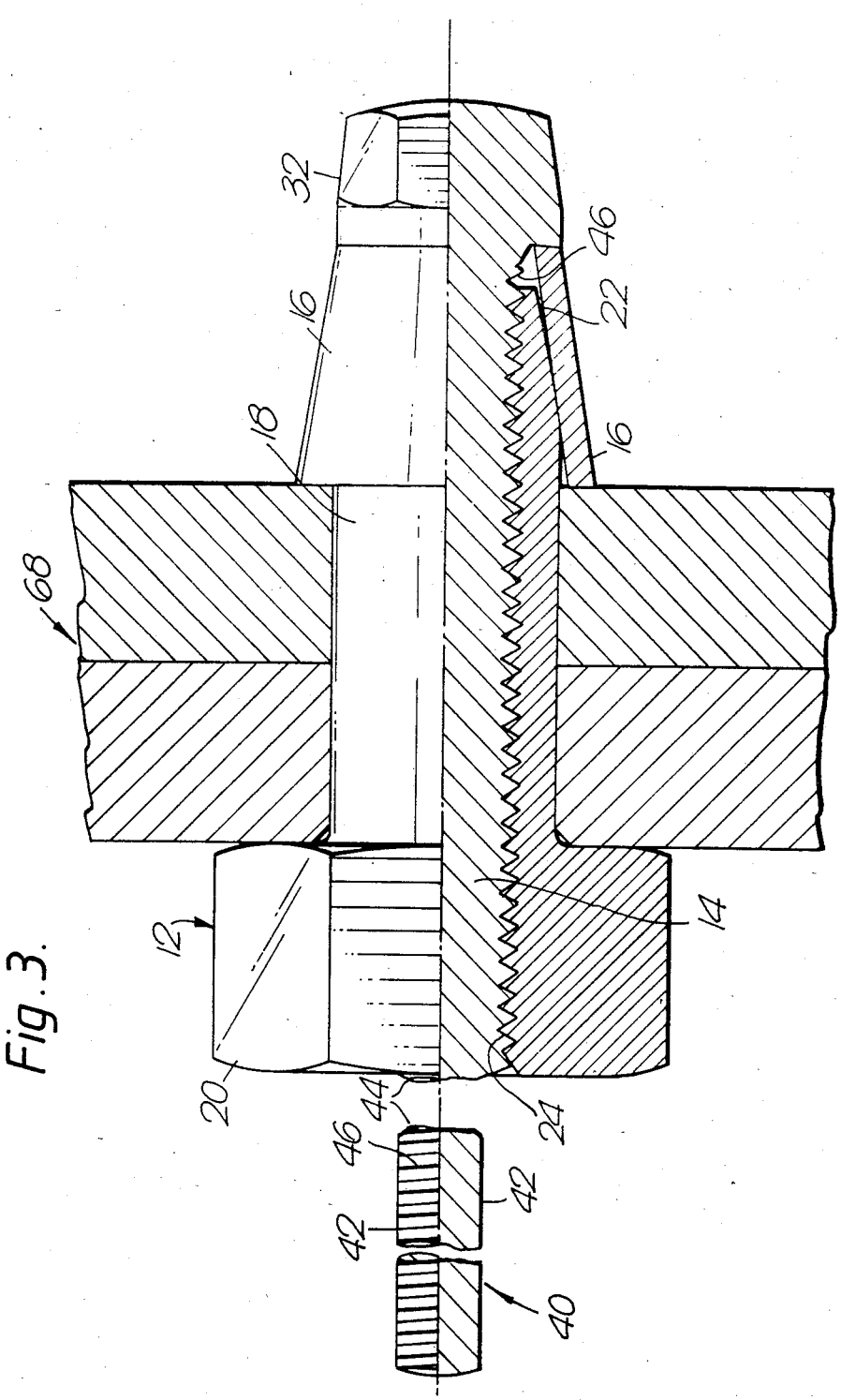
FIG. 3 is an elevation, partly in section and corresponding generally to FIG. 2 but showing the fastener in the set condition.
Figure 4:
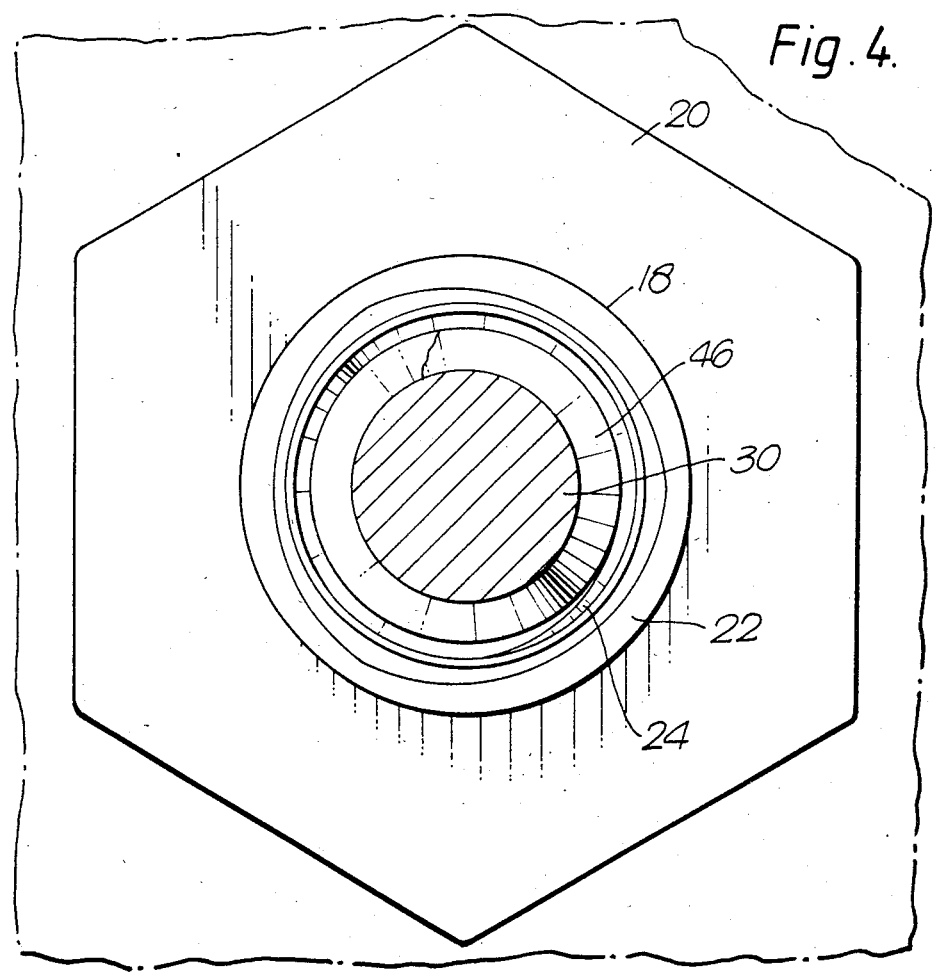
FIG. 4 is an elevation partly in section on the line IV—IV of FIG. 2.
Figure 5:
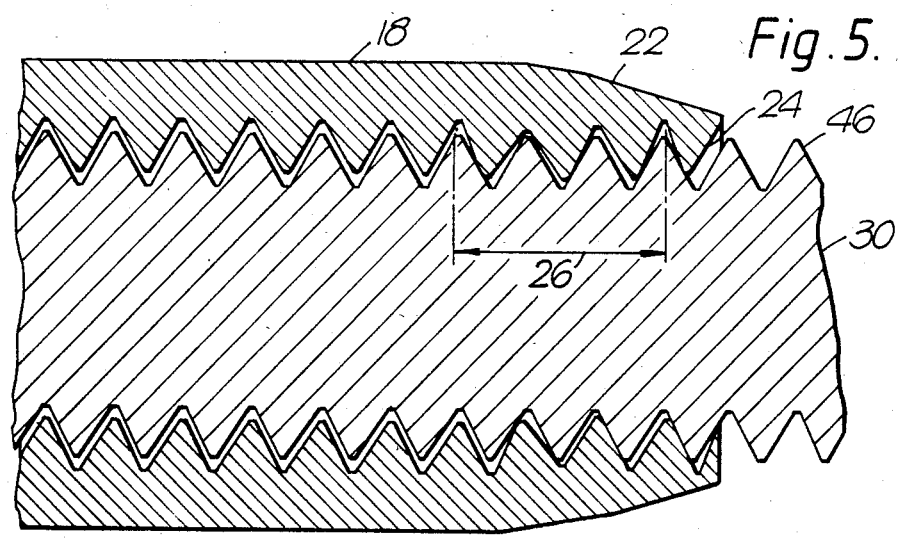
FIG. 5 is a fragmentary longitudinal section of part of the fastener of FIG. 1.

The bolt 14 comprises an elongate stem 30 of greater axial length than the combined lengths of the nut 12 and sleeve 16, and an enlarged head 32 at one end of the stem. As can best be seen in FIG. 2, the head 32 is undercut as indicated by the reference 32'. The head 32 has a plurality of wrenching surfaces 34 to facilitate gripping and rotating of the bolt and in this embodiment the head is of hexagonal shape, there being six of the wrenching surfaces peripherally of the head. However, in another embodiment, the bolt has a head 36 of slightly modified form, as shown in FIG. 6, in which the periphery of the head is circular instead of polygonal, and wrenching surfaces are provided by radial surfaces of two diametrical slots which intersect to form an X-shaped recess 38 in the end of the head remote from the stem of the bolt. A break-off wrenching portion 40 of the bolt stem, most remote from the head 32, is provided with a pair of diamterically opposed wrenching flats 42 to facilitate gripping and rotating of the bolt by a suitable tool. The portion 40 is joined to the remainder of the stem 30 by a breakneck 44 at which the stem will break when subjected to a predetermined torque, enabling the wrenching portion 40 to be detached from the remainder of the bolt which remains as an essential part of the installed fastener, as illustrated in FIG. 3.

The bolt has an external screw thread 46 which is complementary to the screw thread 24 of the nut so as to matingly engage the nut thread. The thread 46 extends throughout the length of the bolt stem 30, except over the surfaces of the breakneck 44 and wrenching flats 42.

The mating threads of the nut and bolt in this embodiment are of the form known as Unified National Fine and, as is well known, this thread is basically of V-shape and flattened at the crest and root. In accordance with usual practice however, the threads 24 and 46 are formed with some rounding of the root and longitudinal edges of the crest, and are dimensioned so as to provide sufficient clearance for the thread of the bolt to be free running in engagement with the thread of the nut.

In a preferred method of forming the nut 12, the bore is initially made parallel and is tapped throughout its length to provide a normal internal screw thread in which the bolt 14 can enter as a free running fit and with a normal clearance within the usual tolerances.

Subsequently, and prior to assembly with the bolt 14, the nut 12 is treated so as to modify the cross-sectional shape of the threaded bore in the locking zone 26 in such a way that the nut will resiliently interfere with the thread of the bolt. It is not necessary to modify the bore throughout its length but merely throughout a length of the bore corresponding to between one and four times the pitch of the thread. In this embodiment, the modification is performed so that the locking zone is within the tapered nose portion 22, and extends over a longitudinal distance corresponding to about twice the pitch of the thread so that two full turns of the thread are affected and thereby adapted to enter into interfering engagement with the bolt thread. The modification is also performed so that the zone 26 in which the thread is modified, is spaced from the tail end of the shank by about one and a half turns of the thread so as to provide a minimum of one full turn of unmodified thread at the tail end to act as a lead-in in order to facilitate entry of the bolt into threaded engagement with the nut when the pieces are being assembled.

The modification has two principle effects. The first of these is to constrict the shank so as to reduce the length of the internal circumference of the bore in the locking zone to a length which is less than that of the original, and the second is to change the cross-sectional shape of the bore within the locking zone of the nut from a circular shape to a non-circular shape.

More specifically, the modification of the bore is carried out with the objective of reducing the clearance between the bolt thread and the thread in the locking zone and shaping the peripheral wall of the bore in the locking zone so that, at the effective diameter of the nut thread, it presents an arcuate peripheral portion or a plurality of circumferentially spaced arcuate peripheral portions which intersect the space into which the bolt has to enter on being assembled with the nut.

The clearance between the thread in the locking zone of the nut and the bolt is reduced so that the circumferential length of the nut, taken at the effective diameter of the nut thread, is reduced to a length nearer that at the effective diameter of the bolt thread. While theoretically the effective diameter of the nut thread could be made the same as but not less than that of the bolt thread, so that there would be no actual clearance, we believe it is desirable to provide some clearance, but as little as possible.

While as few as one such arcuate portion is effective in producing a locking effect between the thread of the nut and an interengaging bolt, we prefer to form a plurality of such arcuate portions, preferably making them of substantially equal length and distributed symmetrically about the axis of the bore so that they will have a symmetrical and self-centering effect on the bolt.

The or each such arcuate peripheral portion of the wall of the bore constitutes a resiliently flexible beam which extends through, and can be said to intrude into, a part of the bore space into which the bolt will enter. Consequently, on inserting the bolt into the nut, it is necessary for the one or more arcuate peripheral portions or beams to yield, bending resiliently so as to allow the bolt to enter the space into which they have intruded. Due to the tendency of the beams resiliently to return into the space now occupied by the bolt, there is positive interference between the interengaging threads and, as the beams curve arcuately in the same sense as the surface of the bolt stem, this occurs over an appreciable circumferential distance. The circumferential length over which the nut and bolt achieve contact and hence the area of contact, is greater than would be the case if the bore were merely made non-circular and not constricted.

The advantage of such extensive contact is that since the beams curve in a single sense, for a given radially inward pressure, we obtain a greater strength of lock compared with that which would be obtained by substantially point contact such as would result if the beams curved in the opposite sense so as to render the shape of the bore reentrant.

The friction due to this interference can be varied by varying either or both of the number of turns of thread in the nut which are modified to interfere with the bolt, and the extent to which the arcuate portions or beams intrude into the bore space required by the bolt. It will of course be appreciated that the latter factor will be governed by the geometry of the shape of the locking zone. Thus, the greater the number interfering arcuate portions, the less will be the extent to which, individually, they interfere. We have found that we obtain better control over the strength of locking between nut and bolt if the degree of interference is greater and the number of interfering portions is smaller. We particularly favour the use of a trilobular form of locking zone in which there are three interfering arcuate portions since this shape provides the maximum interference possible at the same time as providing a self-centering action on the bolt.

We have found it convenient, in making the nut 12, to use a die having a suitably shaped tapered opening or aperture into which the tapered nose portion 22 of the nut can be forced, and thereby to modify the internal cross-sectional shape of the bore by imposing on it a shape corresponding to that of the opening in the die.

It will be apparent to those skilled in the art that the effects of modification referred to above can be achieved in other ways. Thus for example, an internal screw thread could be formed with a locking zone of non-circular shape and reduced circumferential length by a cutting operation in a lathe using a suitable means of control for the lathe such as cams or other programme means. However, the use of a die and a suitable press for forcing the tapered nose of a nut for a blind fastener into the die is both expedient and reliable in producing a consistent product, and we believe, preferable to more sophisticated methods.

Figure 7:
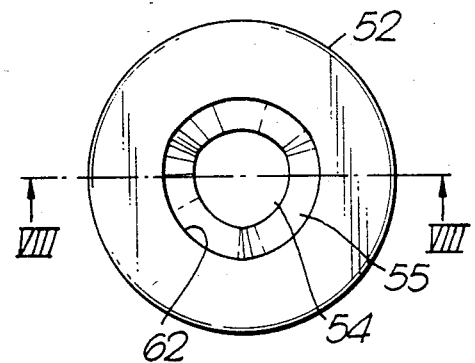
FIG. 7 is a plan view of a die used in the manufacture of a fastener according to the invention.
Figure 8:
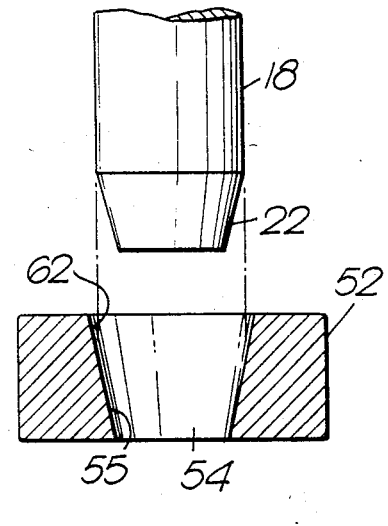
FIG. 8 shows a section on the line VIII—VIII of FIG. 7, and, in elevation, a part of the fastener.

One embodiment of a die used for treating the nut 12 is shown in FIGS. 7 and 8 at 52, is a body of hard steel having an opening, in the form of an aperture 54, for receiving and shaping the tapered nose portion 22 of a nut for a blind fastener, whereby the shape of the bore of the nut can be modified to form a locking zone. In this embodiment, the aperture 54 has a shape which is reminiscent of a truncated cone in that it tapers from a maximum diameter at the top of the die to a smaller diameter at the bottom of the die, and has a peripheral wall 55 the shape of which is a closed, non-reentrant smooth curve. However, at any section on a plane at right angles to the longitudinal axis of the aperture of the die, the peripheral wall has the shape of a closed trilobular curve, indicated by the reference 56 in FIG. 9 to which reference will now be made in describing more particularly the shape of the curve 56.

Figure 9:
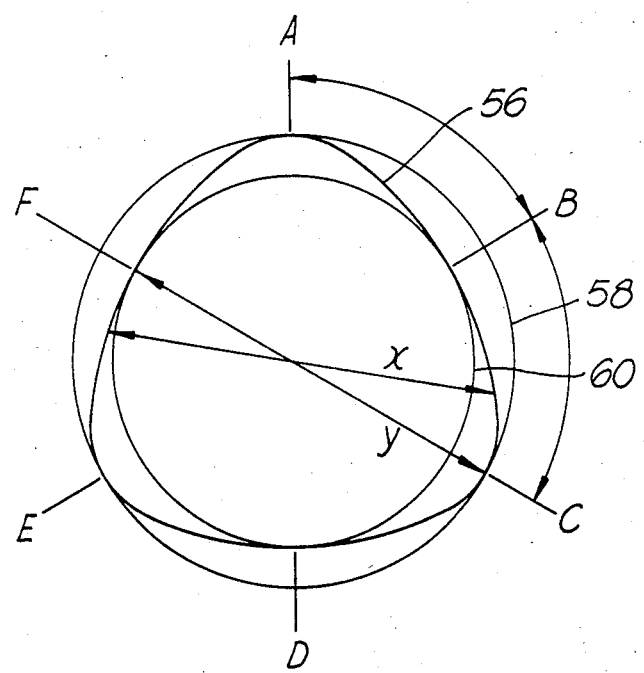
FIG. 9 is a diagram illustrating geometrical properties of the die of FIG. 7.

In FIG. 9, are shown a major circle 58 and a minor circle 60 both having a common centre. The curve 56 lies between the circles 58 and 60 and has three lobes 120° apart. The apices of the lobes are tangential to and touch the major circle 58 at points A,C,E, and, mid-way between the apices, the curve 56 is tangential to and touches the minor circle 60 at points, B,D,F. In other words, the major and minor circles 58 and 60 are, respectively, the escribed and inscribed circles of the curve 56. The arc ABC between the points of contact of the curve 56 with the major and minor circles is a typical smooth curve and, in this embodiment is such that all diametrical chords of the closed curve 56, such as chords X and Y, are the same length. However, it will be understood that each such chord comprises two radii and, save in three exceptional cases, the two radii forming any diametrical chord will be of unequal length, and will, on rotation of the chord about the axis, vary between local maxima and local minima.

It is to be understood that the cross-sectional shape of the die aperture is of the form just described over a sufficient axial length of the aperture 54 to ensure that, when the conical nose 22 of a nut is forced into the aperture until the entire circumference of the nose of the nut is in contact with the peripheral wall of the aperture over the axial length, a shape corresponding to that of the curve 56 will be imposed on a sufficient length of the internal thread of the nut to achieve a locking effect of the desired strength.

The aforementioned contact of the entire circumference of the surface of the nut nose over this axial length is also important because it ensures that the apices of the lobes will be confined by the wall of the die aperture and thereby be prevented from bulging outwardly.

On removing the nut from the die, it is found that little if any deformation of the external surface of the nose of the nut is evident. However, the internal shape of the threaded bore will have assumed a shape corresponding to that of the aperture 54, although of smaller dimensions.

In particular, it is then found that, on entering a bolt 14 into threaded engagement with the nut, it is necessary for the bolt resiliently to deform the nose portion of the nut to a shape more nearly circular in order to pass through the locking zone, and the resistance of the nut to this deformation results in a considerably greater torque being required to advance the stem of the bolt through the locking zone than is the case when the entire length of the nut thread provides a free running fit for the bolt thread.

It is for this reason that the head 32 of the bolt is provided with wrenching surfaces 34 whereby the bolt can be firmly engaged and rotated with sufficient force to overcome the resistance to rotation imposed by the locking zone of the nut during assembly of the pieces.

In order to facilitate initial entry of the bolt stem into the nose end of the bore of the nut, we ensure that at least the first full turn of the thread of the nut, indicated in FIG. 1 by the reference 28, is beyond the region of the locking zone so that the bolt can enter freely and accurately into engagement with the first turn of the thread. Thereafter, further advance of the bolt into the nut can be achieved merely by application of torque.

The first turn 28 of the thread 24 within the nose of the nut is spared substantial modification by the die by reason of two factors. The primary factor is that the angle of taper of the aperture 54 of the die is made slightly smaller than the angle of taper of the nose 22 so that, when the nut nose is forced into the tapered aperture, the die tends to act more upon the wider part of the tapered nose than on the narrower part within which lies the first turn 28 of the thread. The second factor is that care is taken not to force the nose so far into the die as to deform the first turn of thread sufficiently to make it interfere with the bolt thread.

In this embodiment the nose 22 of the nut tapers, before treatment by the die, at an included angle of 34°, and the aperture 54 of the die tapers at an included angle of 24°, which is to say about 10° less than that of the nose 22, this taper angle of the die aperture being that of the generator which passes through the major circles 58 at axially spaced cross-sections of the aperture. The generator which passes through axially spaced minor circles will not be parallel to the first mentioned generator and will include an angle of slightly less than 24°; the angular difference between the two generators is arranged to be such that the cross-sectional shape of the aperture of the die is substantially the same, but of changing dimensions, through a sufficient length of the aperture to achieve the desired working of the nose of the nut.

The dimensions of the aperture 54 are such that the diameter of the minor circle 60 at the widest end (the mouth 62) of the aperture is not less than the maximum diameter of the nose of the nut, in order that the die shall not dig into the conical surface of the nose of the nut. Desirably, the mouth is wide enough to enable the nose to enter far enough into the die to be appreciably spaced from the mouth of the aperture since the die has greater strength at this position. The axial length of the aperture may be sufficient to enable the die to be used for more than one size of nut, nuts of smaller diameter being forced further towards the narrow end of the aperture.

It is preferred that the die act most strongly on the part of the shank of the nut at which the tapered nose merges into the cylindrical part of the shank. However, it is possible to provide a blind fastener according to the invention in which the shank tapers away from the head throughout the whole of its length in which case an arbitrary length of the shank at the end remote from the head can be selected for treatment by the die for formation of a locking zone according to the strength of lock desired.

I claim:

1. A method for forming a nut for a three piece blind fastener having a screw threaded bolt, an expansible sleeve and a tubular nut having an internally screw threaded bore for receiving the bolt in threaded engagement therewith, the bolt comprising a threaded stem having a break off portion at one end connected to the rest of the stem by a breakneck, and a head at the other end of said stem, the nut comprising a shank having an enlarged head at one end and a nose which tapers away from the head at the other end, so that the bolt can be engaged in the bore of the nut so that the break off portion projects from the head of the nut, and the sleeve being interposed on the stem of the bolt between the head of the bolt and the nose of the nut, said method comprising the steps of:

providing a die having an aperture which tapers at an angle smaller than that of the nose of said nut and has a non-circular, non-reentrant cross-sectional shape having a single sense of curvature;

forcing said tapered nose end portion of the shank of the nut into said aperture of said die, and constricting a zone of the bore of said nut spaced from an end face thereof and imposing a cross-sectional shape corresponding to that of said die aperture on said constricted zone.

2. A method according to claim 1, wherein the bore of the nut is constricted in said zone by a degree sufficient to reduce the circumferential length at the effective diameter of the nut to a length not less than the circumferential length at the effective diameter of the bolt.

* * * * *